(12) United States Patent
Cohen-Solal et al.

(10) Patent No.: US 7,173,650 B2
(45) Date of Patent: Feb. 6, 2007

(54) METHOD FOR ASSISTING AN AUTOMATED VIDEO TRACKING SYSTEM IN REAQUIRING A TARGET

(75) Inventors: Eric Cohen-Solal, Ossining, NY (US); Miroslav Trajkovic, Ossining, NY (US); Damian M Lyons, Putnam Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 891 days.

(21) Appl. No.: 09/819,971

(22) Filed: Mar. 28, 2001

(65) Prior Publication Data

US 2002/0140814 A1    Oct. 3, 2002

(51) Int. Cl.
*H04N 9/47* (2006.01)
*H04N 5/225* (2006.01)

(52) U.S. Cl. ...................... 348/172; 348/143
(58) Field of Classification Search ........ 348/135–137, 348/139–142, 143–144, 151–159, 161, 172, 348/150; 386/123; 700/237, 231
See application file for complete search history.

(56) References Cited

U.S. PATENT DOCUMENTS

| | | | | |
|---|---|---|---|---|
| 3,737,902 A | * | 6/1973 | O'Hagan et al. ............. 342/41 |
| 5,031,049 A | | 7/1991 | Toyama et al. ............. 358/227 |
| 5,111,288 A | * | 5/1992 | Blackshear .................. 348/143 |
| 5,434,617 A | | 7/1995 | Bianchi ....................... 348/170 |
| 5,523,783 A | * | 6/1996 | Cho ............................ 348/157 |
| 5,631,697 A | * | 5/1997 | Nishimura et al. ......... 348/172 |
| 5,867,584 A | * | 2/1999 | Hu et al. ..................... 382/103 |
| 5,982,420 A | * | 11/1999 | Ratz ........................... 348/171 |
| 6,055,014 A | * | 4/2000 | Hosonuma et al. ......... 348/143 |
| 6,215,519 B1 | * | 4/2001 | Nayar et al. ................. 348/159 |
| 6,260,759 B1 | * | 7/2001 | Nguyen et al. ............. 235/411 |

FOREIGN PATENT DOCUMENTS

EP    0984632 A2    3/2000

* cited by examiner

*Primary Examiner*—Gims Philippe
(74) *Attorney, Agent, or Firm*—Yan Glickberg

(57) ABSTRACT

A method for reacquiring a target in an automated video tracking system is provided. The method includes the steps of: selecting a desired target to be tracked; switching the automated video tracking system to an automatic mode to initiate a tracking sequence to automatically track the selected desired target; switching the automated video tracking system from an automatic mode to a manual mode if the automated video tracking system encounters a period of difficulty in tracking the desired target; reacquiring the desired target in manual mode; and switching the automated video tracking system to the automatic mode for automatic tracking of the reacquired desired target without initiating a new tracking sequence. An apparatus and automated video tracking system for carrying out the methods of the present invention are also provided.

21 Claims, 2 Drawing Sheets

METHOD FOR ASSISTING AN AUTOMATED VIDEO TRACKING SYSTEM IN REAQUIRING A TARGET

BACKGROUND OF THE INVENTION

1. Field of the Invention

The present invention relates generally to video tracking systems and, more particularly, to a method for reacquiring a target in an automated video tracking system.

2. Prior Art

For purposes of this disclosure, automated tracking is defined as the automatic control of the Pan, Tilt and Zoom (PTZ) motors of a movable PTZ camera so as to keep the camera view centered on a designated, moving target. Automated tracking as defined is used in a number of different applications areas, such as surveillance and security monitoring. In this area, the target is usually a human.

Automated tracking systems typically have several parts, target selection, model generation, and camera control. A target needs to be selected for tracking. This can be via an operator or via an automated motion detection module or other intruder detection system. An internal "model" of the appearance of the target is necessary to allow the tracking system to find the target in subsequent images. A camera motion control model is necessary to determine how to move the camera to keep the target in the center of the field of view.

The present disclosure relates to the problem of target selection and more particularly, on reacquiring a target in an ambiguous situation where the automatic tracker loses the selected target. Identification of potential tracking candidates (i.e., a desired target) in a video scene is typically not part of the function of an automated tracking system. For instance, in the area of surveillance, target selection requires a lot of background knowledge about the objective of any surveillance application. What looks "suspicious" in one surveillance application, e.g. a retail store, may not look suspicious in another, e.g. a parking lot.

In some applications, any source of motion is suspicious, e.g., monitoring a warehouse at night. In that case, an intrusion detection sensor, or a motion sensor, could be used to designate a target for tracking. A more sophisticated automatic monitoring system, could be used to designate targets for certain other applications, as long as the rules to select targets can be clearly enumerated and implemented. However, in general, in most commercially available systems, especially in the domain of surveillance, it is expected that a human operator will indicate the target to the tracking system. Some commercial systems have been developed that fully automate the selection of the target, however, these systems are not robust enough to handle all of the realistic and normal cases that may be encountered in all applications, particularly in surveillance. Furthermore, it is not always suitable to allow the tracking system to have full control of selecting the target because it is possible that another moving target may become more interesting to track. Systems having automated target selection frequently run off of the target, mainly because of the uncontrollable environment (e.g., illumination conditions, multiple people, etc.). Generally, the systems which employ automated target selection work better for applications where conditions are more predictable and less likely to change, such as videoconferencing, presentation, and learning and do not work well where conditions are less predictable, such as surveillance.

In the systems which employ manual target selection, the operator selects the target by using a joystick to control the pan and tilt motors of a PTZ camera and possibly even the zoom motor of the PTZ camera. The operator manipulating the joystick needs to be trained to correctly use the joystick because tracking in a three-dimensional environment can be very difficult, especially where the target does not have a predictable path and/or is moving rapidly.

When an operator designates a person in the video image as the tracking system's target, there is a subtle difference in meaning between the operator's and the tracking system's concept of the target. The operator is designating a person as the target, however, the tracking system is simply accepting a region of the image as the target. Because of this, the operator may not be overly fussy about what part of the person he picks, since after all, its clear to any (human) observer which person he or she selects. Furthermore, the tracking system will form a target model based on exactly what image region the operator selected. As it has no independent knowledge of the desired target it cannot generalize beyond what it is told.

Therefore, there is a need in the art for method and apparatus which permits an operator of an automated video tracking system to take control of the same and reacquire a target when the video tracking system encounters a period of difficulty in tracking the target.

SUMMARY OF THE INVENTION

Therefore it is an object of the present invention to provide a method and apparatus for reacquiring a target in a video tracking system which resolves the problems with the prior art video tracking systems.

Accordingly, a method for reacquiring a target in an automated video tracking system is provided. The method comprises the steps of: (a) selecting a desired target to be tracked; (b) switching the automated video tracking system to an automatic mode to initiate a tracking sequence to automatically track the selected desired target; (c) switching the automated video tracking system from an automatic mode to a manual mode if the automated video tracking system encounters a period of difficulty in tracking the desired target; (d) reacquiring the desired target in manual mode; and (e) switching the automated video tracking system to the automatic mode for automatic tracking of the reacquired desired target without initiating a new tracking sequence.

Preferably, step (a) comprises centering the desired target in a display of a scene including the desired target, step (b) comprises releasing control of an input device used to select the desired target, (c) comprises controlling an input device used to select the desired target, step (d) comprises centering the desired target in a display of a scene including the desired target, and step (e) comprises releasing control of an input device used to reacquire the desired target.

Also provided is an apparatus for reacquiring a target in an automated video tracking system, where the apparatus comprises: selecting means for selecting a desired target to be tracked; mode switching means for switching the automated video tracking system to and from one of an automatic mode to initiate a tracking sequence after target selection to automatically track the selected desired target and a manual mode; reacquiring means for reacquiring the desired target in manual mode if the automated video tracking system encounters a period of difficulty in tracking the desired target; wherein after reacquiring the desired target the automated video tracking system is switched back to automatic mode without initiating a new tracking sequence.

Preferably, the selecting means comprises an input device for centering the desired target in a display of a scene including the desired target, the mode selecting means comprises an input device where the automated video tracking system is switched to automatic mode by controlling an input device used to select the desired target and the automated video tracking system is switched to manual mode by releasing control of the input device, and the reacquiring means comprises an input device for centering the desired target in a display of a scene including the desired target. The apparatus preferably further comprises: a video camera for capturing video image data of a scene including the desired target; pan and tilt camera motors for controlling a pan and tilt, respectively of the video camera; and a video display for displaying the video image data; wherein the input device is a joystick operatively connected to the pan and tilt motors such that movement of the joystick controls the movement of the camera through the pan and tilt motors.

Still yet provided is an automated video tracking system for tracking and reacquiring a target. The automated video tracking system comprises: a video camera for capturing video image data of a scene including a desired target; pan and tilt camera motors for controlling a pan and tilt, respectively of the video camera; a video display for displaying the video image data; selecting means for selecting the desired target to be tracked; mode switching means for switching the automated video tracking system to and from one of an automatic mode to initiate a tracking sequence after target selection to automatically track the selected desired target and a manual mode; reacquiring means for reacquiring the desired target in manual mode if the automated video tracking system encounters a period of difficulty in tracking the desired target; wherein after reacquiring the desired target the automated video tracking system is switched back to automatic mode without initiating a new tracking sequence.

Preferably, the selecting means comprises an input device for centering the desired target in the display, the mode selecting means comprises an input device where the automated video tracking system is switched to automatic mode by controlling an input device used to select the desired target and the automated video tracking system is switched to manual mode by releasing control of the input device, and the reacquiring means comprises an input device for centering the desired target in a display of a scene including the desired target. Preferably, the input device is a joystick operatively connected to the pan and tilt motors such that movement of the joystick controls the movement of the camera through the pan and tilt motors.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of video tracking systems, it has been found particularly useful in the environment of surveillance and security systems. Therefore, without limiting the applicability of the invention to surveillance and security systems, the invention will be described in such environment. Those skilled in the art will appreciate that the methods and apparatus of the present invention also have usefulness in such areas as videoconferencing and multi-modal interfaces for consumer devices.

Figure 1:
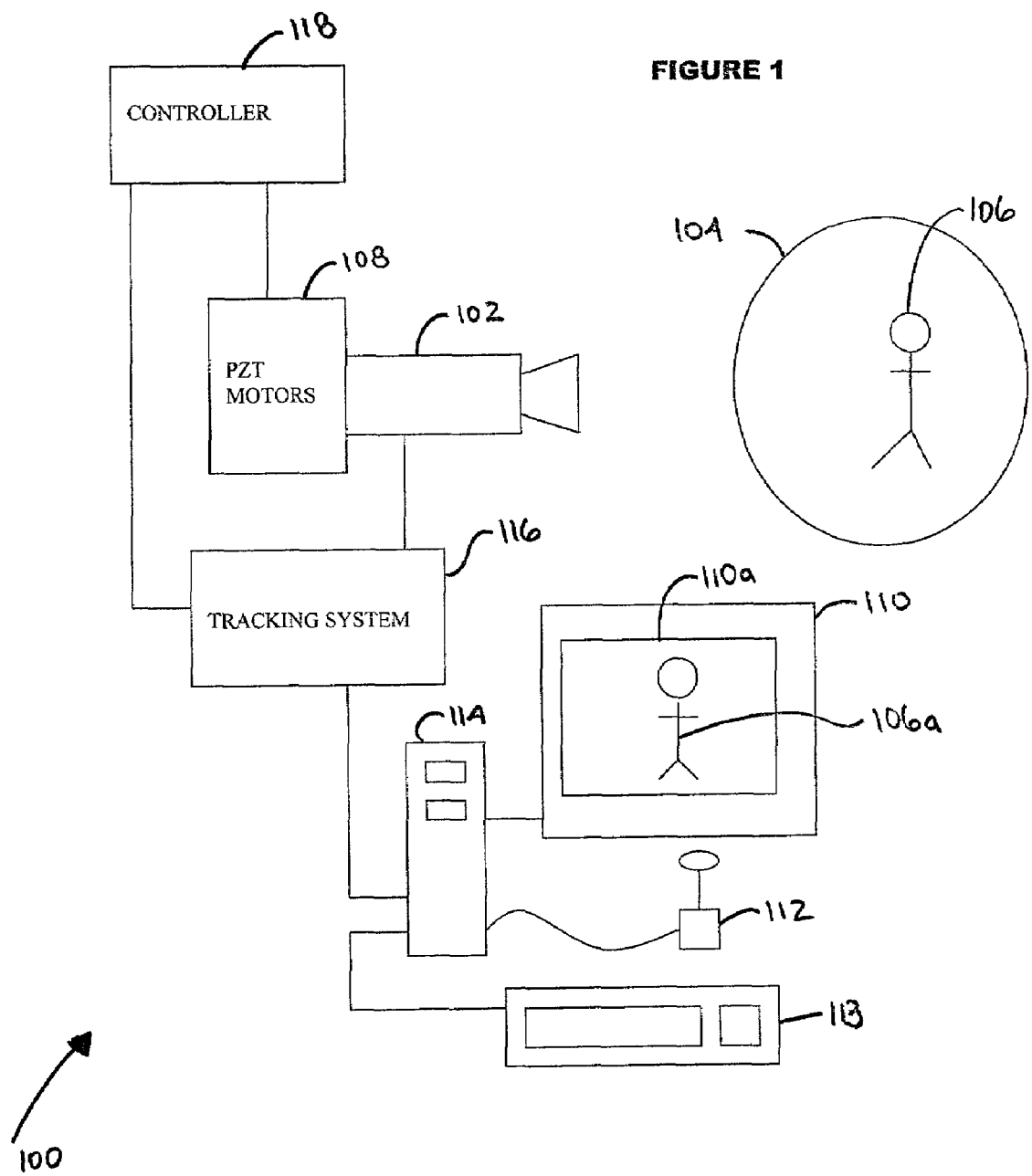
FIG. 1 illustrates a preferred video tracking system of the present invention.

Referring now to FIG. 1, there is illustrated a preferred implementation of the video tracking system of the present invention, generally referred to by reference numeral 100. The apparatus 100 comprises a camera 102 for providing video image data of a scene 104 having a desired target 106 to be tracked. The camera 102 is preferably a PTZ camera having PTZ motors 108 for controlling the pan, tilt and zoom of the camera 102. Such camera and motors for their control are well known in the art.

The apparatus 100 further includes a display, such as a computer monitor 110 for displaying the video image data of the scene 104 from the camera 102, the monitor's display being referred to by reference numeral 110a. An input device is used to select the desired target 106a in the video image data. Reference numeral 106 is used herein to indicate the actual target while reference numeral 106a indicates the image of the target as displayed on the monitor 110. The input device is preferably a joystick 112 connected to a computer processor 114 which also controls the PTZ motors 108 of the camera 102. However, any input device that is capable of selecting a target in the video image display can be utilized without departing from the scope or spirit of the present invention. Such other input devices can be a computer mouse, touchpad, touchscreen, touchpen, or even a keyboard 113 connected to the computer 114.

Once the operator has selected the target 106a, a tracking system 116 generates a model of the target 106a that can be used to locate the target 106a in successive frames of the video image data. Such tracking systems are well known in the art. Although shown separately in FIG. 1, the tracking system 116 is preferably implemented by software contained on a peripheral device (not shown) in the computer processor 114.

Typically, there are two interconnected ways in which the model is used, to distinguish the target 106a from the background scene or to distinguish the target 106a from other occluding targets. Because the model is gathered from the video image, it is clear that it can only contain information about appearance. This gives rise to the most important constraint limiting the behavior of automated tracking, referred to as the appearance constraint. In general, a target can only be successfully tracked if its appearance distinguishes it from other potential targets. In other words, if the target does not have something unique about its appearance within the kind of visual environments in which the tracker is operating, then it is not possible to build a unique "model" for that target.

Of course, a trained human observer is very good at picking up small clues from the visual image that are beyond the current state of the art in computer vision. For example, a surveillance operator can recognize a target from a partial view of his face, or by noting that a person has a unique way of holding his head. In general, an automated tracker is limited to looking at features of the video image such as whether or not a person has moved since the last frame, or the color composition of the clothes of an individual. An automated tracker is also typically limited by the resolution of the camera image and by the lighting conditions in the field of view. Human operators can handle a wide range of different lighting conditions and variation of lighting within a scene. For this reason, even distinguishable targets may occasionally fail to be tracked.

Once a model of the target 106a is generated, a controller 118 is then instructed by the tracking system 116 to control the PTZ motors 108 to move the camera 102 to keep the selected target 106 centered in the field of view of the camera 102. Such controllers 118 are also well known in the art. The controller 118, like the tracking system 116, is preferably implemented by software contained on a peripheral device on the computer 114. Two general approaches for controlling the camera 102 that are widely used in the prior art include a discrete approach in which the camera 102 is moved from time to time to keep the target 106 centered and a continuous approach in which the camera 102 is moved to keep the target 106 continuously centered.

It may appear that the continuous case is simply the discrete case where the period between camera movements approaches zero. However, in general, both the tracking system 116 and the camera controller 118 needed, will be quite different for each of these. In the discrete approach, the tracking system 116 needs to have enough information about the camera 102 to accurately move it a large distance to re-center the target 106. Typically this means knowing the Pan, Tilt and Zoom settings of the camera 102 at all times, and being able to command the camera 102 to go to specific settings. Advantages of this approach include the fact that the camera 102 is only moved infrequently, and when it does move it can move very quickly and hence keep up with a very fast target 106. Disadvantages include the fact that the target 106 is rarely centered, that the camera PTZ position needs to be known, and that the fast moves may disorient an operator.

In the continuous approach, the tracking system needs to move the camera 102 a small distance but at a high rate. Although position control could be used to do this, the resultant motion would not be smooth. Instead velocity control of the Pan, Tilt and Zoom settings of the camera 102 is well suited to performing smooth motion. No position feedback is necessary since velocities are recalculated so frequently. However, it is necessary that the image processing component of tracking be capable of dealing with images that are taken during camera motion (since the camera is almost always in motion). Advantages of this approach include the fact that the target 106 is always well centered. Disadvantages include the fact that the camera 102 is always moving if the target 106 is moving and that a fast target 106 may be lost.

Whichever approach is used to control the camera 102, the results of which are fed to the controller 118 which determines the amount of camera movement necessary to keep the target 106 centered in the field of view of the camera 102. The controller 118 outputs an appropriate signal to the PTZ motors 108 of the camera 102 to carry out its instructions to keep the target 106 centered in the camera's 102 field of view. Such systems are well known in the art.

Figure 2:
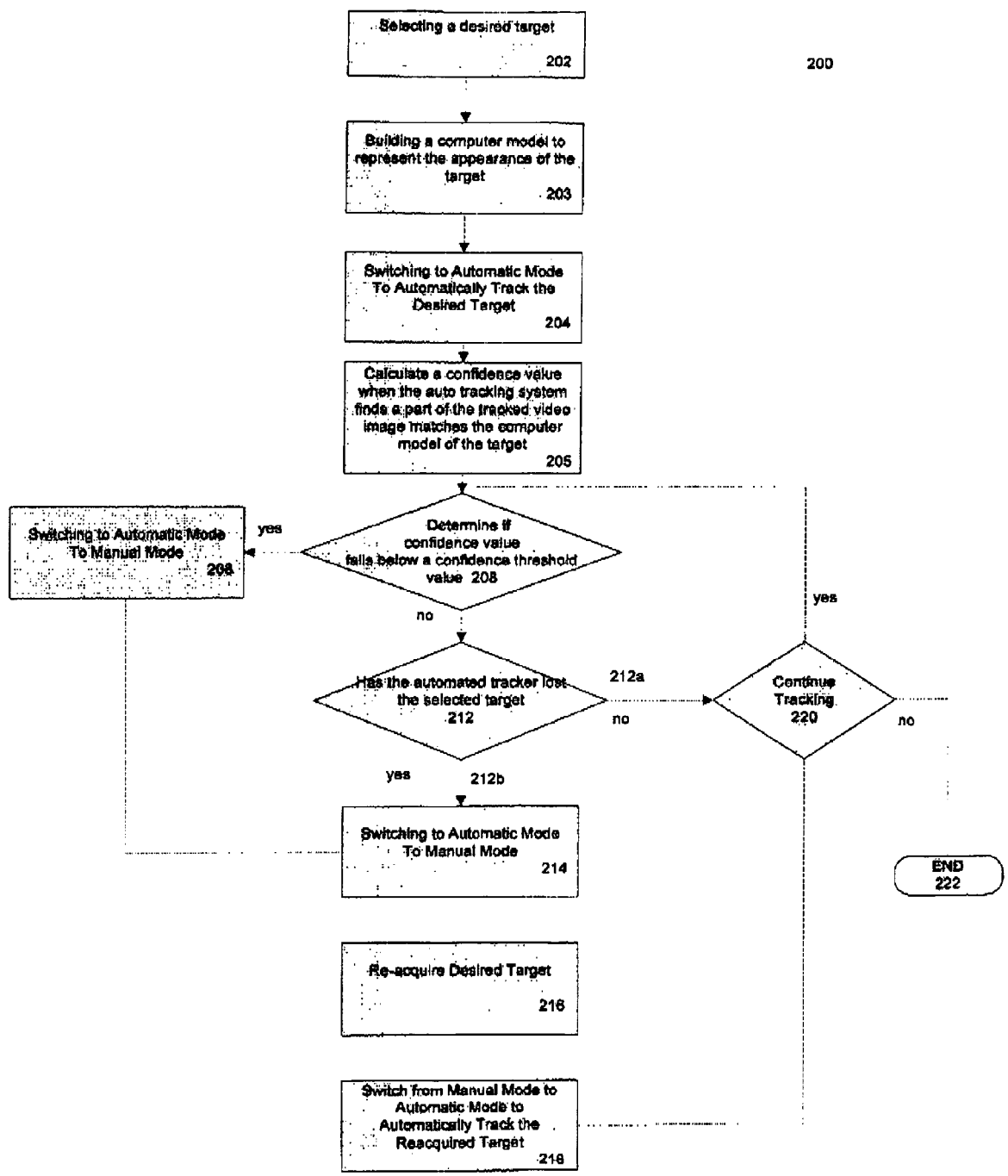
FIG. 2 illustrates a flowchart showing the steps of a preferred method for reacquiring a target in the video tracking system of FIG. 1.

A further aspect of the methods and apparatus of the present invention will now be described with reference to the apparatus of FIG. 1 and the flowchart of FIG. 2. FIG. 2 illustrates a method for reacquiring a target 106 in an automated video tracking system, the method generally referred to by reference numeral 200.

At step 202, a desired target 106 to be tracked is selected. This can be done by any means known in the art. Preferably, the target 106 is selected by centering the target 106a in the monitor's display 110a by manipulating the joystick 112 to control at least the pan and tilt motors 108 of the camera 102, and possibly the zoom motor 108. At step 203, a computer model is build to represent the appearance of that target 106a. At step 204 after selecting a desired target 106a, the automated video tracking system is switched to an automatic mode to initiate a tracking sequence to automatically track the selected desired target 106a. Switching to automatic mode can be achieved manually such as by selecting a button on a user interface (not shown) in the monitor's display 110a. However, it is preferred that the switch to automatic mode occurs automatically, preferably upon releasing control of the joystick 112 or other input device used to select the desired target 106a. At step 205, the automated video tracking system calculates a confidence value whenever the tracker finds a part of the image that matches to the target model. The confidence value represents how well the target 106a matches the model. This number can vary for example from 0% match to 100% match. Where the 100% indicates that the target matches the model completely. A control can also be provided to indicate a threshold value for the confidence. At step 208, it is determined whether the confidence value falls below a threshold value. If so, at step 210, the operator is preferably warned by a signal of some form that the confidence is lower than the threshold and the tracking is about to fail and the process continues at step 214 where the system switches from automatic mode to manual mode in which case the operator may take over for the system for the time it takes for the target to pass the source of difficulty by reacquiring the target, after which control is given back to the automatic tracking system.

If it is determined that the confidence value does not fall below the confidence threshold value at step 208, at step 212 it is determined if the video tracking system has encountered a period of difficulty and has lost the selected target 106a or may be in jeopardy of losing the selected target 106a. The period of difficulty could result from the model matching the target with less than the threshold value. If not, the method proceeds along path 212a and the automated video tracking system continues to automatically track the selected target until the method is terminated, the selected target 106a leaves the scene 104, or it is no longer desired to track the selected target 106a, all of which are shown schematically as steps 220 and 222. If the operator perceives a difficulty has or is about to be encountered, the method proceeds along path 212b by switching from automatic mode to manual mode at step-214. In manual mode, the operator may take over for the system for the time it takes for the target to pass the source of difficulty by reacquiring the target, after which control is given back to the automatic tracking system. As with the switching into automatic mode, switching from automatic mode to manual mode can be manually done by the operator or automatically upon taking control of the joystick 112 or other input device used to select the desired target 106a.

Once in manual mode, the operator reacquires the desired target at step 216. It is preferred that the target is reacquired in a simpler manner as compared to the way it is initially selected, namely, by centering the desired target 106a in the monitor's display 110a of the scene 104 by manipulating the joystick 112 or other input device. However, those skilled in the art will appreciate that the desired target can be selected and/or reacquired by any means known in the art without departing from the scope or spirit of the present invention.

Once the target is reacquired, the automated video tracking system is switched back to the automatic mode at step 218 where desired target is automatically tracked without initiating a new tracking sequence. It is important for the operator to quickly reacquire the desired target 106a so that a new tracking sequence is not initiated after the target 106a is reacquired and automatic tracking restarted. Preferably, automatic tracking restarts by either a manual instruction from the user, as discussed above, or preferably automatically by releasing control of the joystick 112 or other input device used to reacquire the desired target 106a. After switching back to automatic mode, the automatic video tracking system continues to track the reacquired target 106a until the target leaves the scene, tracking of the reacquired target is no longer desired, or another area of difficulty is encountered by the automatic tracking system, all of which are shown as steps 220 and 222.

As discussed above, when the target 106a is selected, a computer model is build to represent the appearance of that target 106a. During tracking of the target 106a, whenever the tracker finds a part of the image that matches to the target model, it preferably computes a number which represents how well the target 106a matches the model. This number can vary for example from 0% match to 100% match. Where the 100% indicates that the target matches the model completely. This value is called the confidence value. A control can also be provided to indicate a threshold value for the confidence. Thus, should the model match the target with less than this threshold value, the operator is preferably warned by a signal of some form that the confidence is lower than the threshold and the tracking is about to fail. In such a situation, the operator may take over for the system for the time it takes for the target to pass the source of difficulty by reacquiring the target, after which control is given back to the automatic tracking system.

In summary, a means is used for switching an automatic video tracking system between two modes, automatic and manual, such as by controlling a joystick 112 or other input device. An operator initializes automatic tracking by centering the target in the image using the joystick 112 or other input device. After releasing the joystick 112, the automatic tracker enters automatic mode, locks on the selected target, and automatically tracks the selected target. If a particular situation happens which is difficult for the automatic video tracking system to resolve, for instance multiple people passing by the same location at the same time as the selected target, the operator may take over for the system for the time it takes for the target to pass the source of difficulty.

Those skilled in the art will appreciate that the apparatus and methods of the present invention allows an operator of a video tracking system, when necessary, to take control of the camera 102 by simply manipulating the joystick 112 or other input device. Thus, when something ambiguous to the video tracking system occurs which is difficult for the automatic video tracking system to resolve, the operator can take control of the camera 102 back for a certain period of time to reacquire the target. This greatly simplifies the training needed by an operator and the operator's task in tracking the target.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for reacquiring a target in an automated video tracking system, the method comprising the steps of:
   (a) selecting a desired target to be tracked;
   (b) constructing a computer model of the selected target;
   (c) switching the automated video tracking system to an automatic track mode to initiate a tracking sequence to automatically track the selected desired target based on correlation between a video image of the selected, tracked target and the previously constructed computer model;
   (d) during said automatic track mode, the automated video tracking system calculating a confidence value indicating a degree of correlation between the tracked video image of the target and the previously constructed computer model of said tracked target;
   (e) during said automatic track mode, the automated video tracking system providing a warning to a user indicating that said automatic track mode is about to fail whenever said calculated confidence value falls below a pre-determined threshold confidence value;
   (f) if the automated video tracking system encounters a period of difficulty in tracking the tracked selected desired target, manually guiding tracking the selected target until the selected target is reacquired and said period of difficulty has passed; and
   (g) switching the automated video tracking system to the automatic mode for automatic tracking of the reaquired selected desired target based on the previously constructed computer model without constructing a new computer model.

2. The method of claim 1, wherein step (a) comprises centering the desired target in a display of a scene including the desired target.

3. The method of claim 1, wherein step (c) comprises releasing control of an input device used to select the desired target.

4. The method of claim 1, wherein step (d) comprises controlling an input device used to select the desired target.

5. The method of claim 1, wherein step (e) comprises centering the desired target in a display of a scene including the desired target.

6. The method of claim 1, wherein step (f) comprises releasing control of an input device to indicate that the desired target has been reacquired and to recommence automatic tracking based on the previously built computer model.

7. An apparatus for reacquiring a target in an automated video tracking system, the apparatus comprising:
   selecting means for selecting a desired target to be tracked and causing a computer model of the selected target to be built;
   mode switching means for switching the automated video tracking system between an automatic mode to automatically track the selected desired target based on a correlation between the video image of the tracked target and the previously built computer model and a manual mode;
   calculation means for calculating a confidence value indicating a degree of correlation between the video image of the tracked target and the previously built computer model of said tracked target;
   warning means for providing a warning to a user indicating that said calculated confidence value has fallen below a pre-determined threshold confidence value to prompt a user to enter the manual mode and manually track the selected target until the selected target has been reacquired with above the predetermined threshold confidence value;

the selected target has been manually reacquired, recommencing tracking in the automatic mode based on the correlation between the tracked video image and the previously built computer model without constructing a new video model.

8. The apparatus of claim 7, wherein the selecting means comprises an input device for centering the selected desired target in a display of a scene including the selected desired target.

9. The apparatus of claim 8, further comprising:

a video camera for capturing video image data of a scene including the video image of the tracked target;

pan and tilt camera motors for controlling a pan and tilt, respectively of the video camera; and a video display for displaying the video image data;

wherein the input device is a joystick operatively connected to the pan and tilt motors such that movement of the joystick controls the movement of the camera through the pan and tilt motors in the manual mode.

10. An apparatus for reacquiring a target in an automated video tracking system, the apparatus comprising:

selecting means for selecting a desired target to be tracked:

mode selecting means for switching the automated video tracking system to and from one of an automatic mode to initiate a tracking sequence after target selection to automatically track the selected desired target and a manual mode, the mode selecting means including:

an input device where the automated video tracking system is switched to automatic mode by controlling an input device used to select the desired target and the automated video tracking system is switched to manual mode by releasing control of the input device;

calculation means for calculating a confidence value indicating a degree of correlation between the video image of the tracked target and a previously constricted computer model of said tracked target;

warning means for providing a warning to a user indicating that said automatic track mode is about to fail whenever said calculated confidence value falls below a pre-determined threshold confidence value;

reacquiring means for reacquiring the desired target in manual mode in response to and during the automated video tracking system encountering a period of difficulty in tracking the desired target;

wherein after reacquiring the desired target the automated video tracking system is switched back to automatic mode without initiating a new tracking sequence.

11. The apparatus of claim 10, further comprising:

a video camera for capturing video image data of a scene including the desired target;

pan and tilt camera motors for controlling a pan and tilt, respectively of the video camera; and a video display for displaying the video image data;

wherein the input device is a joystick operatively connected to the pan and tilt motors such that movement of the joystick controls the movement of the camera trough the pan and tilt motors.

12. The apparatus of claim 10, wherein the input device for manually centering the selected tracked target in a video display of a scene including the video image of the tracked target.

13. The apparatus of claim 12, further comprising:

a video camera for capturing video image data of a scene including the video image of the tracked target;

pan and tilt camera motors for controlling a pan and tilt, respectively of the video camera; and a video display for displaying the captured video scene;

wherein the input device includes a joystick operatively connected to the pan and tilt motors in the manual mode such that movement of the joystick manually controls the movement of the camera through the pan and tilt motors.

14. An automated video tracking system for backing and reacquiring a target, the automated video tracking system comprising:

a video camera for capturing video image data of a scene including a desired target;

pan and tilt camera motors for controlling a pan and tilt respectively, of the video camera;

a video display for displaying the video image data selecting means for selecting the desired target to be tracked;

mode switching means for switching the automated video tracking system to and from one of an automatic mode to initiate a tracking sequence after target selection to automatically track the selected desired target and a manual mode;

calculation means for calculating a confidence value indicating a degree of correlation between the video images of the tracked target and a previously constructed computer model of said tracked target;

warning means for providing a warning to a user indicating that said automatic track mode is about to fail whenever said calculated confidence value falls below a pre-determined threshold confidence value;

reacquiring means for reacquiring the desired target in manual mode in response to and during the automated video tracking system encountering a period of difficulty in tracking the desired target;

wherein after reacquiring the desired target the automated video tracking system is switched back to automatic mode without initiating a new tracking sequence.

15. The automated video tracking system of claim 14, wherein the selecting means comprises an input device for centering the desired target in the display.

16. The automated video tracking system of claim 15, wherein the input device is a joystick operatively connected to the pan and tilt motors such that movement of the joystick controls the movement of the camera through the pan and tilt motors.

17. The apparatus of claim 14 wherein the selecting means and the reacquiring means includes:

an input device through which a user (a) manually controls the pan and tile motors, (b) designates the desired target to be tracked and causes a computer model of the selected target to be constructed, (c) manually controls the pan and tilt motors when the confidence value falls below the predetermined confidence value, and (d) causes the automated tracking system to switch back to the automatic mode to recommence tracking based on the previously constructed computer model.

18. The automated video tracking system of claim 17, wherein the input device includes the selecting switch through which the automated video tracking system is switched to automatic mode and manual mode.

19. The automated video tracking system of claim 18, wherein the input device is a joystick operatively connected to the pan and tilt motors such that movement of the joystick controls the movement of the camera through the pan and tilt motors.

20. The automated video tracking system of claim 17, wherein the input device centers the desired target in the display of the scene to select the target to be tracked.

21. The automated video tracking system of claim 20, wherein
the input device is a joystick operatively connected to the pan and tilt motors such that movement of the joystick controls the movement of the camera through the pan and tilt motors.

* * * * *